United States Patent
Aliakseyeu et al.

(10) Patent No.: US 10,742,069 B2
(45) Date of Patent: Aug. 11, 2020

(54) CONTROL SYSTEM FOR CONTROLLING A LIGHTING DEVICE ARRANGED FOR PROVIDING FUNCTIONAL AND/OR ATMOSPHERE LIGHTING

(71) Applicant: SIGNIFY HOLDING B.V., Eindhoven (NL)

(72) Inventors: Dzmitry Viktorovich Aliakseyeu, Eindhoven (NL); Philip Steven Newton, Waalre (NL); Bartel Marinus Van De Sluis, Eindhoven (NL); Tim Dekker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 104 days.

(21) Appl. No.: 16/081,187

(22) PCT Filed: Feb. 21, 2017

(86) PCT No.: PCT/EP2017/053912
§ 371 (c)(1),
(2) Date: Aug. 30, 2018

(87) PCT Pub. No.: WO2017/148744
PCT Pub. Date: Sep. 8, 2017

(65) Prior Publication Data
US 2019/0074718 A1 Mar. 7, 2019

(30) Foreign Application Priority Data
Mar. 4, 2016 (EP) .................................... 16158655

(51) Int. Cl.
*H02J 50/10* (2016.01)
*H04W 4/02* (2018.01)
(Continued)

(52) U.S. Cl.
CPC .............. *H02J 50/10* (2016.02); *H02J 50/80* (2016.02); *H02J 50/90* (2016.02); *H04W 4/026* (2013.01); *H05B 47/19* (2020.01); *H02J 50/40* (2016.02)

(58) Field of Classification Search
CPC ....................................................... H02J 50/10
See application file for complete search history.

(56) References Cited

U.S. PATENT DOCUMENTS

2009/0290332 A1* 11/2009 Jacobs .................... H05B 45/37
362/183
2010/0327766 A1 12/2010 Recker et al.
(Continued)

FOREIGN PATENT DOCUMENTS

| GB | 2494537 A | 3/2013 |
|---|---|---|
| WO | 2015148929 A1 | 10/2015 |
| WO | 2015162081 A2 | 10/2015 |

OTHER PUBLICATIONS

Wikipedia contributors. "Wireless power transfer." Wikipedia, The Free Encyclopedia. Wikipedia, The Free Encyclopedia, Mar. 19, 2020. Web. Mar. 25, 2020. (Year: 2020).*

*Primary Examiner* — Daniel J Cavallari (57) ABSTRACT

A control system 100 for controlling a lighting device 110 arranged for providing functional and/or atmosphere lighting is disclosed. The control system 100 comprises a detector 102 for detecting a presence of a portable device 120 at a wireless power transmitter 130 arranged for charging the portable device 120, a processor 104 for generating a lighting control command 108 when the presence of the portable device 120 has been detected, and a communication unit 106 for communicating the lighting control command 108 to the lighting device 110.

13 Claims, 6 Drawing Sheets

(51) Int. Cl.
  *H05B 47/19*  (2020.01)
  *H02J 50/80*  (2016.01)
  *H02J 50/90*  (2016.01)
  *H02J 50/40*  (2016.01)

(56) References Cited

U.S. PATENT DOCUMENTS

| | | |
|---|---|---|
| 2013/0300356 A1 | 11/2013 | Yang |
| 2014/0203770 A1 | 7/2014 | Salter et al. |
| 2015/0296598 A1 | 10/2015 | Haid et al. |
| 2015/0296599 A1 | 10/2015 | Recker et al. |
| 2015/0357862 A1 | 12/2015 | Saari et al. |
| 2016/0087484 A1* | 3/2016 | Kim .................. H02J 7/025 320/101 |

* cited by examiner

CONTROL SYSTEM FOR CONTROLLING A LIGHTING DEVICE ARRANGED FOR PROVIDING FUNCTIONAL AND/OR ATMOSPHERE LIGHTING

CROSS-REFERENCE TO PRIOR APPLICATIONS

This application is the U.S. National Phase application under 35 U.S.C. § 371 of International Application No. PCT/EP2017/053912, filed on Feb. 21, 2017, which claims the benefit of European Patent Application No. 16158655.7, filed on Mar. 4, 2016. These applications are hereby incorporated by reference herein.

FIELD OF THE INVENTION

The invention relates to a control system for controlling a lighting device arranged for providing functional and/or atmosphere lighting. The invention further relates to a portable device for controlling a lighting device arranged for providing functional and/or atmosphere lighting. The invention further relates to a wireless charging system for controlling a lighting device arranged for providing functional and/or atmosphere lighting. The invention further relates to a method of controlling a lighting device arranged for providing functional and/or atmosphere lighting. The invention further relates to a computer program product for executing the method.

BACKGROUND

Future and current home and professional environments will contain a large number of controllable lighting devices for creation of functional and/or atmosphere lighting. These lighting devices can be controlled individually or in groups via a user interface of a smart device (e.g. a smartphone or a tablet pc) and use wireless communication technologies like Bluetooth or ZigBee to communicate with the smart devices. In smart lighting systems, lighting devices are controlled based on the presence of a user, which presence may be detected by presence sensors, such as PIR sensors, or the presence may be detected based on information received from an (indoor) positioning system. Such presence detection systems control the lighting system autonomously, and these systems typically allow users to further adjust the settings by providing user input via their smart device.

U.S. patent application 20150357862 A1 relates to an apparatus for receiving an indication of presence of a wireless charging field, detecting a change of orientation of a device during the presence of the wireless charging field and controlling an application parameter based on the detected change. The application parameter may comprise controlling light brightness at home.

SUMMARY OF THE INVENTION

It is an object of the present invention to provide an alternative way for control of a lighting system. It is a further object of the present invention to provide a lighting control system for charging portable devices.

According to a first aspect of the present invention, the object is achieved by a control system for controlling a lighting device arranged for providing functional and/or atmosphere lighting, the control system comprising:

a detector for detecting a presence of a portable device at a wireless power transmitter arranged for charging the portable device, a processor for generating a lighting control command when the presence of the portable device has been detected, and a communication unit for communicating the lighting control command to the lighting device.

The control system enables control of the lighting device when the presence of the portable device is detected at the wireless power transmitter. An advantage of this control system is that it allows a user to simply position his or her portable device, such as a smartphone, tablet pc, portable lighting device, etc. at the wireless power transmitter, whereupon the lighting device is controlled (e.g. turned on, controlled according to a predefined light setting, etc.). Another advantage of this system is that it triggers a user to position his or her portable device at the wireless power transmitter, and therewith triggers the user to charge the battery of the portable device.

In an embodiment of the control system, the processor is further arranged for identifying a property of the portable device, and for generating the lighting control command based on the identified property. The property may, for example, be an identifier of the portable device, a type of portable device, etc. The processor is arranged for generating the control command based on the identified property, which is advantageous because it allows the processor to infer, based on the property, what type of lighting is required for a specific portable device. In a further embodiment of the control system, the property is related to a current mode of operation of the portable device, and the processor is further arranged for generating the lighting control command based on the current mode of operation. The mode of operation may, for example, be an 'on' mode, a 'movie' mode, a 'charging mode', an 'office' mode, etc. This allows the processor to control the lighting device based on the mode of operation of the portable device (the processor may for example control the lighting device according to a movie light setting when a user is watching a movie on the portable device (e.g. a tablet pc)).

In an embodiment of the control system, the processor is arranged for identifying at which wireless power transmitter of a plurality of wireless power transmitters the portable device is present, and for generating the lighting control command based thereon. This is advantageous because it allows the processor to determine the light setting of the lighting device(s) based the location of the portable device (i.e. at which wireless power transmitter the portable device is present). For example, if the portable device is located at a wireless power transmitter embedded in the dinner table, the processor may control the lighting device according to a 'dinner' light setting, while if the portable device is located at a wireless power transmitter embedded in a sofa, the processor may control the lighting device according to a 'reading' light setting.

In an embodiment of the control system, the processor is further arranged for receiving a light setting signal indicative of a light setting from the portable device, and for generating the lighting control command further based on the light setting signal. The light setting, and therewith the light setting signal, may be a predefined light setting, a user selected light setting, etc. An advantage of this embodiment is that it enables a user to select a light setting, for example via a user interface of the portable device. The light setting is communicated to the lighting device when the presence of the portable device is detected at the wireless power transmitter.

In an embodiment of the control system, the processor is further arranged for identifying a repositioning of the portable device from a first wireless power transmitter to a second wireless power transmitter, and the processor is further arranged for generating the lighting control command based on the repositioning. The repositioning may be indicative of a user input for controlling the light output of the lighting device. The repositioning (the movement/gesture from the first wireless power transmitter to the second wireless power transmitter) may, for example, be indicative of a change of color of the lighting device. This allows a user to control the lighting device by interacting with the portable device (and with a plurality of wireless power transmitters), which is advantageous because it provides further lighting control options for the user. This is further beneficial because it enables interaction with the lighting device in an easy way without requiring dedicated user interaction devices.

According to a second aspect of the present invention, the object is achieved by a portable device for controlling a lighting device arranged for providing functional and/or atmosphere lighting, the portable device comprising the control system of any one of the above-mentioned embodiments, wherein the detector is arranged for detecting the presence of the portable device at the wireless power transmitter based on a signal received from the wireless power transmitter. The portable device may comprise the detector, the processor and the communication unit of the control system. As such, the portable device comprises the hardware (and the software) to detect the presence of the wireless power transmitter. The integration of the software and hardware in the portable device is advantageous, because all the elements to control the lighting device is comprised in one device (the portable device). Many existing portable devices (e.g. smartphones) already comprise hardware and software which enable wireless lighting control and the detection of a wireless power transmitter. This removes the need for a smart wireless charging system. Furthermore, this may enable the portable device to control the lighting system for different wireless charging systems, regardless whether the wireless charging system(s) are arranged for communication with the lighting system or not.

According to a third aspect of the present invention, the object is achieved by a wireless charging system for controlling a lighting device arranged for providing functional and/or atmosphere lighting, the wireless charging system comprising:

a wireless power transmitter for charging a portable device, and a control system according to the control system of any one of the above-mentioned embodiments.

The wireless charging system may comprise the detector, the processor and the communication unit of the control system. As such, the wireless charging system comprises the hardware (and the software) to detect the presence of the portable device. The integration of the software and hardware in the wireless charging system is advantageous, because this may enable the wireless charging system to control the lighting system for different chargeable portable devices, regardless whether the portable device(s) are arranged for communication with the lighting system or not.

In an embodiment of the wireless charging system, the processor of the control system is further arranged for identifying a type of the portable device, and for generating the lighting control command based on the type of the portable device. The processor is arranged for generating the control command based on the type of the portable device, which is advantageous because it allows the processor to infer, based on the type, what type of lighting is required for a specific portable device (e.g. a handheld game console may require a different light setting than an e-reader).

In an embodiment of the wireless charging system, the wireless charging system comprises a plurality of wireless power transmitters, and the detector is arranged for detecting a presence of a first portable device at a first wireless power transmitter, and for detecting a presence of a second portable device at a second wireless power transmitter. The processor is further arranged for identifying a first property of the first portable device, and for identifying a second property of the second portable device, and for generating the lighting control command based on the first property and the second property. This enables the processor to infer, based on the type of one or more objects, a social/business setting of one or more users. This allows the processor to control the device according to the social/business setting (for example: multiple smart phones may indicate a social setting, thus requiring a social (ambient) light setting, a laptop pc and a wireless computer mouse may indicate an office setting, thus requiring an office (functional) light setting).

According to a fourth aspect of the present invention, the object is achieved by a method of controlling a lighting device arranged for providing functional and/or atmosphere lighting, the method comprising:

detecting a presence of a portable device at a wireless power transmitter arranged for charging the portable device, generating a lighting control command when the presence of the portable device has been detected, and communicating the lighting control command to the lighting device.

In an embodiment of the method, the method further comprises the steps of:

identifying at which of a plurality of wireless power transmitters the portable device is present, accessing a memory storing associations between wireless power transmitter identifiers and light settings, comparing an identifier of the identified wireless power transmitter to the stored wireless power transmitter identifiers, and, if a similarity criterion is met between the identified identifier and the stored wireless power transmitter identifier, generating the lighting control command according to a light setting associated with the stored wireless power transmitter identifier.

In an embodiment of the method, the method further comprises the steps of:

identifying a property of the portable device, and generating the lighting control command based on the property of the portable device.

According to a fifth aspect of the present invention, the object is achieved by a computer program product for a computing device, the computer program product comprising computer program code to perform the method of any one of the above-mentioned methods when the computer program product is run on a processing unit of the computing device.

It should be understood that the claimed methods and/or computer program product may have similar and/or identical embodiments and/or advantages as the claimed control system, portable device and/or wireless charging system.

BRIEF DESCRIPTION OF THE DRAWINGS

The above, as well as additional objects, features and advantages of the disclosed control systems, portable devices, wireless charging systems and methods, will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
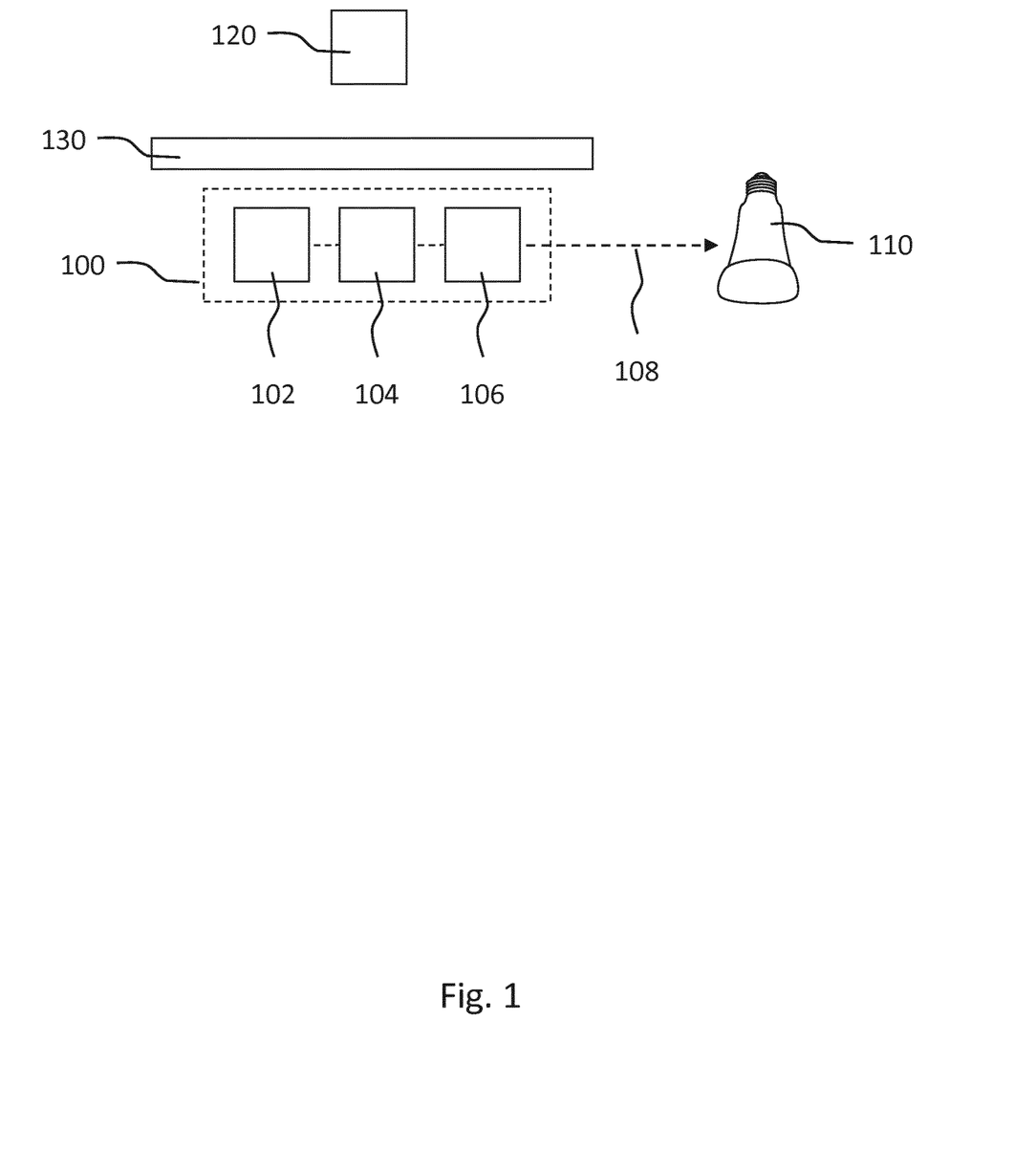
FIG. 1 shows schematically an embodiment of a control system according to the invention for controlling a lighting device.

FIG. 1 shows schematically an embodiment of a control system 100 according to the invention for controlling a lighting device 110 arranged for providing functional and/or atmosphere lighting. The control system 100 comprises a detector 102 for detecting a presence of a portable device 120 at a wireless power transmitter 130 arranged for charging the portable device 120. The control system 100 further comprises a processor 100 for generating a lighting control command 108 when the presence of the portable device 120 has been detected, and a communication unit 106 for communicating the lighting control command 108 to the lighting device 110.

The processor 104 (e.g. a microchip, circuitry, a microcontroller, etc.) is arranged for generating the lighting control command 108 when the presence of the portable device 120 has been detected. The lighting control command 108 may comprise control instructions for the lighting device 110, which control instructions may, for example, comprise instructions to turn the lighting device on/off and/or to change the light output (e.g. the intensity/brightness, color, saturation, color temperature, etc.).

The communication unit 106 is arranged for communicating the lighting control command 108 to the lighting device 110. The communication unit 106 may comprise hardware for transmitting the lighting control command 108 via any wired or wireless communication protocol. The communication unit 106 may, for example, communicate the lighting control command 108 by transmitting a message, data, a packet, etc. to the lighting device 110. Various wired and wireless communication protocols may be used, examples include but are not limited to Ethernet, DMX, DALI, USB, Bluetooth, Wi-Fi, Li-Fi, 3G, 4G or ZigBee. A specific communication technology may be selected based on the communication capabilities of the lighting device 110, the power consumption of the communication driver for the (wireless) communication technology and/or the communication range of the signals.

The control system 100 is arranged for controlling a lighting device 110, which is arranged for providing functional lighting (such as task lighting, accent lighting, etc.) and/or atmosphere lighting (such as ambient lighting). The lighting device 110 may be any type of lighting device arranged for receiving lighting control commands. The lighting device 110 may comprise an LED light source, an incandescent light source, a fluorescent light source, a high-intensity discharge light source, etc. The lighting 110 device may be installed in a luminaire or in a lighting fixture. In embodiments, the control system 100 may be arranged for controlling a plurality of such lighting devices 110 when the presence of the portable device 120 has been detected at the wireless power transmitter 130. The control system 100 may control the plurality of lighting devices 110 according to light settings or light scenes, which may be predefined and stored in a memory, which memory may be accessible by the processor 104. Such light settings or light scenes may comprise information of lighting control settings for the plurality of lighting devices (a light setting/light scene may, for example, comprise instructions to set a first lighting device to a first color and a second lighting device to a second color).

The control system 100 comprises the detector 102 for detecting the presence of the portable device 120 at the wireless power transmitter 130. The wireless power transmitter 130 is part of a wireless charging system, which may use inductive charging, wherein an electromagnetic field is created from within the wireless charging system by applying an electric current to a first induction coil. The portable device 120 comprises a second induction coil for detecting the electromagnetic field when it is in proximity of the first induction coil, and converts it back into electric current to charge the battery of the portable device 120.

The portable device 120 comprises a battery arranged to be charged by the wireless power transmitter 130. The portable device 120 comprises an induction coil coupled to the battery, which induction coil is arranged for detecting an electromagnetic field created by the wireless power transmitter 130. The portable device 120 may be any type of device arranged to be charged by the wireless power transmitter 130. Examples of portable devices 120 include but are not limited to smartphones, tablets, watches, laptops, e-readers, remote control devices, wireless computer peripherals such as keyboards and mouse devices, wireless lighting devices, wireless speakers, kitchen appliances, office appliances, etc.

Figure 2A:
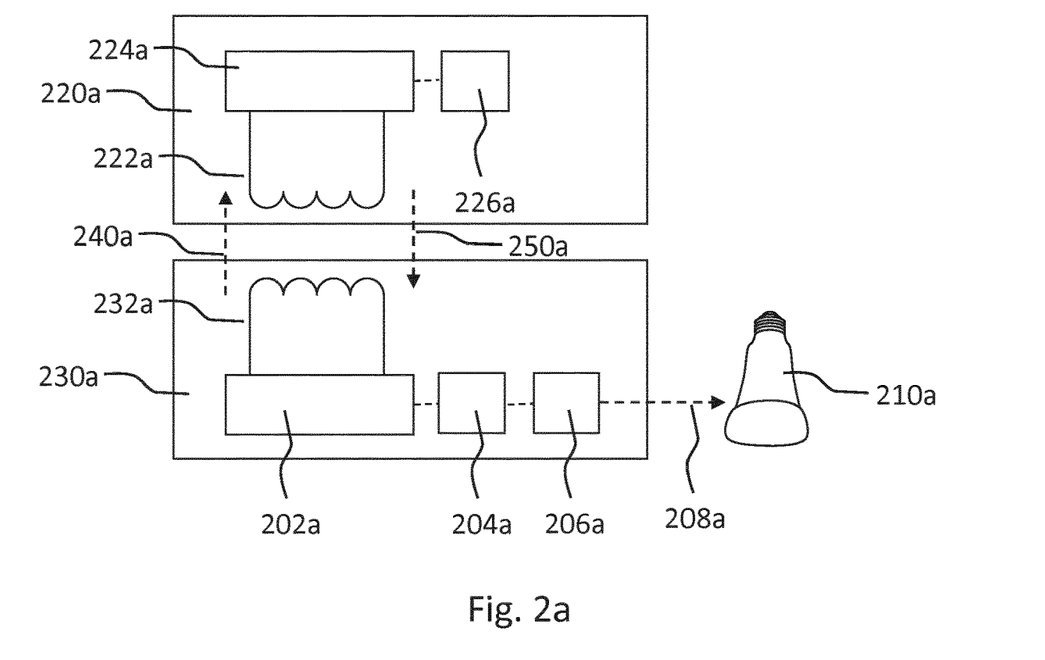
FIG. 2a shows schematically an embodiment of a control system according to the invention for controlling a lighting device, wherein the control system is comprised in a wireless charging system.
Figure 2B:
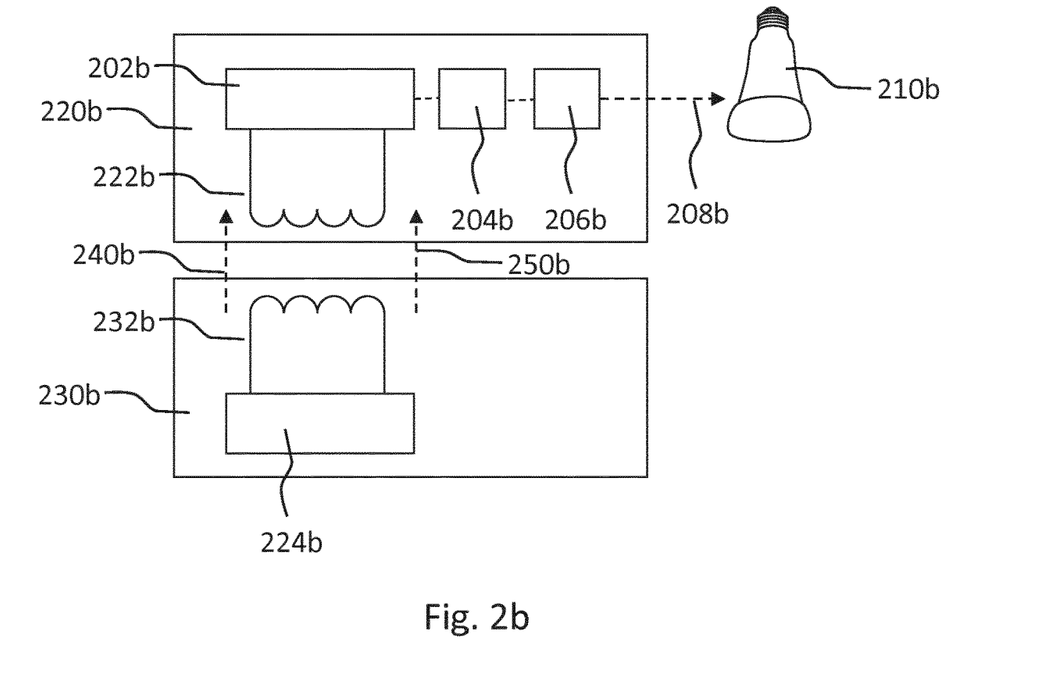
FIG. 2b shows schematically an embodiment of a control system according to the invention for controlling a lighting device, wherein the control system is comprised in a portable device.

The processor 104 of the control system 100 may be further arranged for identifying a property of the portable device, and for generating the lighting control command based on the identified property. The processor 104 may be arranged for receiving signals indicative of the property. In an embodiment wherein the processor 104 is comprised in the wireless power transmitter 130 (as illustrated in FIG. 2a), the property of the portable device 120 is communicated to the processor 104, for example via any of the below-mentioned communication methods. In an alternative embodiment, wherein the processor 104 is comprised in the portable device 120 (as illustrated in FIG. 2b), the processor may have direct access to a memory storing the property.

The property may, for example, be related to a (current) mode of operation of the portable device. The current mode of operation may, for example, be indicative of the on/off setting of the portable device 120. As such, the processor 104 may generate a first lighting control command when the portable device 120 is turned on (the portable device 120 may for example be a tablet pc, and, when the tablet pc is turned on, the processor 104 may generate a lighting control command to increase the intensity of the light emitted by the lighting device 110 so as to decrease the contrast between the display of the tablet pc and the environment), and generate a second lighting control command when the portable device 120 is turned off (for example a lighting control command which controls the lighting device 110 such that it emits light according to the light setting that was active before the tablet pc was turned on). Additionally or alternatively, the mode of operation may relate to a software program (an application, for example a music application, a video application, an office application, a social media application, etc.) that is running on the portable device 120. If, for example, a user is watching a movie on the portable device 120, the processor 104 may generate a sequence of lighting control commands indicative of colored light settings according to the content of the movie, so as to enhance the movie watching experience. Alternatively, if a text editor software program is running on the portable device 120, the processor 104 may generate a lighting control command which sets the lighting device 110 to a functional illumination setting (e.g. bright white light).

Additionally or alternatively, the property may, for example, be related to a type of portable device 120. The processor 104 may, for example, determine that the portable device 120 is an e-reader device (and additionally determine that the e-reader is turned on based on an identified mode of operation), and based on this information generate a lighting control command to set the light setting of the lighting device 110 to a reading setting (e.g. a yellow colored light). Alternatively, the processor 104 may determine that the portable device 120 is a portable lighting device, and generate the lighting control command for the lighting device 110 so as to complement a current light setting of the portable lighting device (which current light setting may be an identified current mode of operation).

Additionally or alternatively, the property may, for example, be related to a user profile. This enables the processor 104 to discriminate between different users, and generate the lighting control command based on an identified user. The lighting control command may, for example, comprise control instructions related to preferences of the identified user. For example, a first user may charge a first portable device at a wireless power transmitter, whereupon the processor 104 may retrieve a first lighting preference (e.g. yellow light) from a memory and generate the lighting control command accordingly (e.g. a signal comprising instructions to set the light output of the lighting device 120 to yellow). A second user may charge a second portable device at the wireless power transmitter, whereupon the processor 104 may retrieve a second lighting preference (e.g. white light) from a memory and generate the lighting control command accordingly (e.g. a signal comprising instructions to set the light output of the lighting device 120 to white).

Additionally or alternatively, the property may, for example, be related to an identifier of the portable device.

The processor 104 may be further arranged for accessing a memory arranged for storing associations between portable device identifiers and light settings. This enables the processor 104 to generate the lighting control command by comparing an identified identifier to a stored identifier, and if a similarity criterion is met between the identified identifier and the stored identifier, generate the lighting control command according to a light setting associated with the stored identifier. In turn, the identifier of the portable device may be associated with a specific user profile from which lighting preferences may be derived (e.g. based on the user's age, gender, lighting preferences, etc.).

The processor 104 may be further arranged for receiving a light setting signal indicative of a light setting from the portable device 120. The light setting, and therewith the light setting signal, may be a predefined light setting, a user preference setting, a user-selected light setting, etc. The processor 104 is further arranged for generating the lighting control command 108 based on the received light setting signal, whereupon the lighting control command 108 is communicated to the lighting device 110. This enables a user to select a light setting, for example via a user interface of the portable device 120, whereupon the lighting device 120 is controlled accordingly.

The detector 102 of the control system 100 may be located at the wireless power transmitter (e.g. in the wireless charging system, as illustrated in FIG. 2a), in the portable device 120 (as illustrated in FIG. 2b) or the control system 100 may be comprised in a further device. Alternatively, the components of the control system 100 may be comprised in a plurality of devices. For example, the detector 102 may be comprised in the wireless power transmitter 130, and the processor 104 and the communication unit 106 may be comprised in the portable device 120.

The detector 102 may be arranged for detecting the presence of the portable device 120 based on a change in capacitance or resonance at the wireless power transmitter 130. When presence is detected, a handshake between the wireless power transmitter 130 and the portable device 120 may occur so as to identify the portable device 120. Such handshake may comprise a (burst) power transmission by the wireless power transmitter 104, whereupon a wireless power receiver of the portable device 120 awakens and responds by providing an identification and/or a signal strength status, for example by changing the load seen by the wireless power transmitter. The wireless power transmitter 130 may only transmit power when a valid portable device 120 is identified. After identification, the portable device 120 is charged accordingly and its presence is communicated to the processor 104.

Additionally, the portable device 120 may be further arranged for communicating with the wireless power transmitter 130 by changing the load seen by the wireless power transmitter 130. This load variation results in a change in the wireless power transmitter's 130 coil current, which is measured and interpreted by a controller of the wireless power transmitter 130. As such, digital communication can be established between the portable device 120 and the wireless power transmitter 130. Various types of communication packets can thus be communicated to the wireless power transmitter 130. Examples of communication packets include but are not limited to identification and authentication packets, error packets (which may be indicative of a request for a power/current adjustment), end power packets (indicative of a full battery), power usage packets and other data packets (which may comprise information regarding, for example, the type of the portable device 120, an identifier of the portable device 120, lighting control information (such as light settings), operational mode information, etc.). Additionally or alternatively, the wireless power transmitter 130 and the portable device 120 may both comprise transceivers for communicating the communication packets via other wireless communication protocols, such as via NFC, ZigBee, Bluetooth, Wi-Fi, etc.

FIGS. 2a and 2b illustrate exemplary configurations of the control system according to the invention. FIG. 2a shows schematically an embodiment of a control system according to the invention for controlling the lighting device 210a, wherein the control system is comprised in a wireless charging system 230a, which comprises a first induction coil 232a, a detector 202a, a processor 204a and a communication unit 206a. The detector 202a further comprises a driver (not shown) for controlling the amount of power 240a transmitted by the first induction coil 232a. FIG. 2a further shows the portable device 220a which comprises a second induction coil 222a and a controller arrangement 224a for power rectification and voltage conditioning. The controller arrangement 224a is further arranged for varying load 226a in order to communicate with the wireless charging system 230a (see previous paragraphs for details on communication). This enables the portable device 220a to communicate information 250a to the wireless charging system 230a.

The processor 204a may be further arranged for identifying a property of the portable device 220a (for example one of the above-mentioned properties). The portable device 220a may communicate the property to the wireless charging system 230a by communicating digital messages 250a to the wireless charging system 230a by temporally varying the load 226a. Alternatively, the wireless charging system 230a may comprise a receiver for receiving signals 250a (e.g. via Bluetooth, Wi-Fi, ZigBee, NFC, RF, etc.) from the portable device 220a, the signals comprising information about the property. The processor 204a may further generate the lighting control command 208a based on the identified property, whereupon the lighting control command 208a is communicated to the lighting device 210a by the communication unit 206a.

FIG. 2b shows schematically an embodiment of a control system according to the invention for controlling the lighting device 210b, wherein the control system is comprised in a portable device 220b, which comprises a second induction coil 222b, a detector 202b, a processor 204b and a communication unit 206b. The detector 202b may be further arranged for charging a battery (not shown) of the portable device 220a. FIG. 2b further shows a wireless charging system 230b which comprises a first induction coil 232b and a driver 224b for controlling the amount of power 240b transmitted by the first induction coil 232b. The driver 224b may be further arranged for communicating with the portable device 220b by varying the current provided by the first induction coil 232b (see previous paragraphs for details on communication), which variation in current may be detected by the detector 202b of the portable device 220b. This enables the wireless charging system 230b to communicate information 250b to the portable device 220b.

The processor 204b may be further arranged for identifying a property of the wireless charging system 230b (e.g. an identifier). The wireless charging system 230b may communicate the property to the portable device 220b by communicating digital messages 250b to the portable device 220b by temporally varying the current. Alternatively, the portable device 220b may comprise a receiver for receiving signals 250b (e.g. via Bluetooth, Wi-Fi, ZigBee, NFC, RF, etc.) from the wireless charging system 230b, the signals comprising information about the property. The processor 204b may further generate the lighting control command 208b based on the identified property, whereupon the lighting control command 208b is communicated to the lighting device 210b by the communication unit 206b.

The processor 104 of the control system 100 may be further arranged for identifying at which wireless power transmitter of a plurality of wireless power transmitters the portable device is present. In an embodiment wherein the detector 102, the processor 104 and the communication unit 106 are comprised in the wireless charging system (as illustrated in FIG. 2a), the control system 100 may further comprise a plurality of detectors at each of the plurality of wireless power transmitters. This allows the (one or more) processor(s) 104 to determine at which wireless power transmitter of the plurality of wireless power transmitters the portable device 120 is present. In an alternative embodiment, wherein detector 102, the processor 104 and the communication unit 106 are comprised in the portable device 120 (as illustrated in FIG. 2b), the processor 104 may be arranged for identifying a wireless power transmitter (for example based on an identifier received from the wireless power transmitter) so as to determine at which wireless power transmitter of the plurality of wireless power transmitters the portable device 120 is present. The processor 104 generates the lighting control command based on at which wireless power transmitter of the plurality of wireless power transmitters the portable device 120 is present. The processor 104 may, for example, be arranged for accessing a memory arranged for storing associations between wireless power transmitter identifiers and light settings, and for comparing an identifier of the identified wireless power transmitter to the stored wireless power transmitter identifiers. The processor 104 may be further arranged for, if a similarity criterion is met between the identified identifier and the stored wireless power transmitter identifier, generating the lighting control command according to a light setting associated with the stored wireless power transmitter identifier. This enables a user to control the lighting device 110 by moving the portable device 120 from a first wireless power transmitter (where the lighting device 110 is controlled according to a first light setting) to a second wireless power transmitter (where the lighting device 110 is controlled according to a second light setting).

Figure 3:
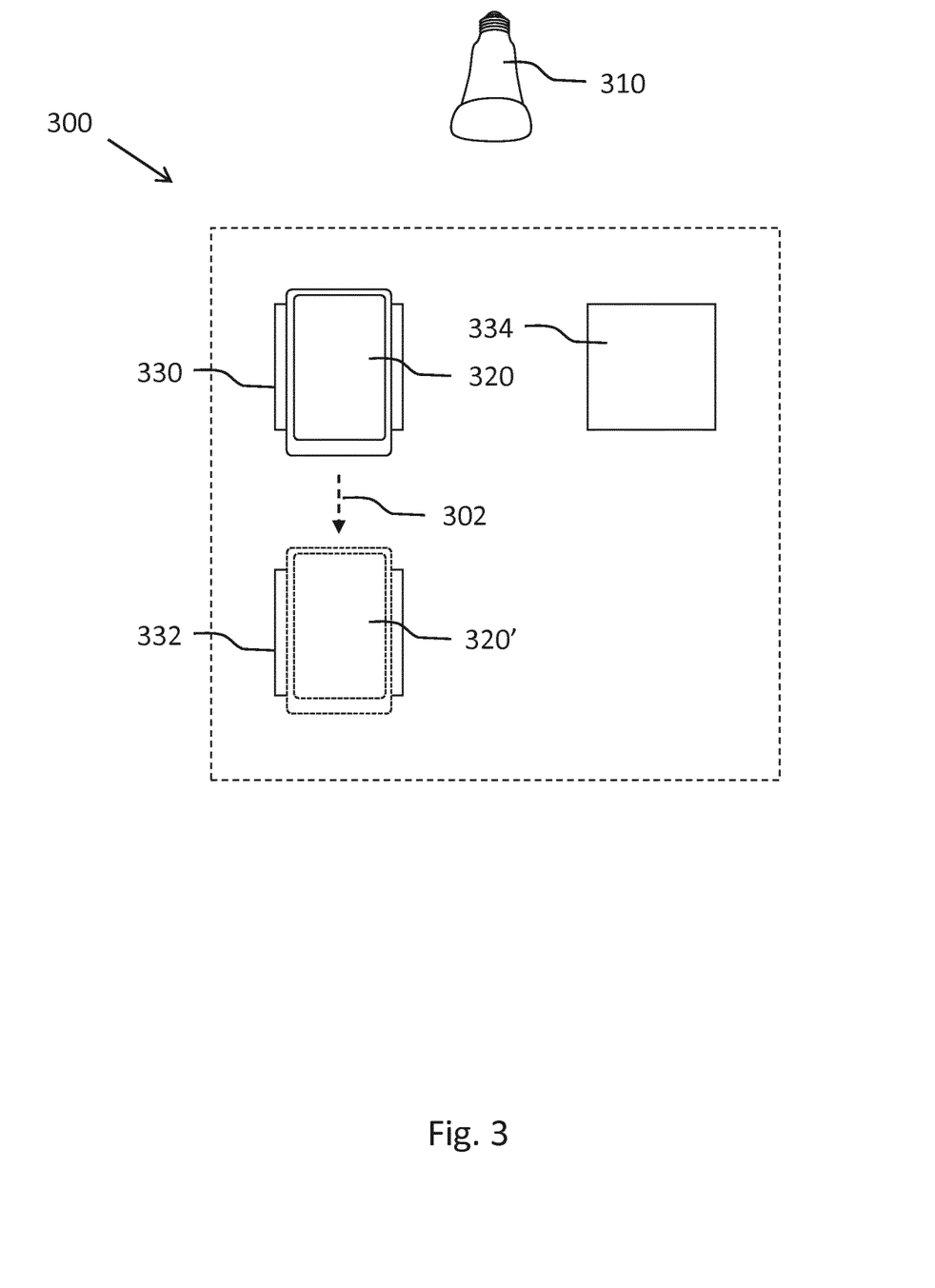
FIG. 3 shows schematically an embodiment of a control system according to the invention for controlling a lighting device, wherein the control system comprises a plurality of wireless power transmitters.

FIG. 3 shows schematically an embodiment of a control system 300 according to the invention for controlling a lighting device 310, wherein the control system 300 comprises a plurality of wireless power transmitters 330, 332 and 334. The processor (not shown) of the control system 300 is arranged for detecting at which wireless power transmitter 330, 332, 334 portable device 320 is present. In the example of FIG. 3, portable device 320 is first present at first wireless power transmitter 330. The processor may generate a lighting control command based on this presence (for example, the first wireless power transmitter 330 may be located in the kitchen and the processor may control one or more lighting devices according to a light setting associated with the first wireless power transmitter 330, for example a 'kitchen' light setting). When the portable device 320 is moved from the first wireless power transmitter 330 to a second wireless power transmitter 332, one or more detectors (not shown) may detect the presence of portable device 320' at the second wireless power transmitter 332, whereupon the processor may generate a lighting control command based on this presence (for example, the second wireless power transmitter 332 may be located in the living room and the processor may control one or more lighting devices according to a light setting associated with the second wireless power transmitter 332).

The processor 104 may be further arranged for identifying a repositioning of the portable device 120 from a first wireless power transmitter to a second wireless power transmitter. This repositioning may be interpreted as a user input. This embodiment may be beneficial when a surface (such as a table top) comprises a plurality of wireless charging surfaces adjacent to each other. In an embodiment wherein the detector 102, the processor 104 and the communication unit 106 are comprised in the wireless charging system (as illustrated in FIG. 2*a*), the control system 100 may further comprise a plurality of detectors at each of the plurality of wireless power transmitters. This allows the (one or more) processor(s) 104 to determine the repositioning (i.e. the subsequent presence of the portable device 120 at a plurality of wireless power transmitters) of the portable device 120. In an alternative embodiment, wherein detector 102, the processor 104 and the communication unit 106 are comprised in the portable device 120 (as illustrated in FIG. 2*b*), the processor 104 may be arranged for identifying wireless power transmitters (for example based on identifiers received from the wireless power transmitters) so as to determine the repositioning of the portable device 120 (i.e. the subsequent presence of the portable device 120 at a plurality of wireless power transmitters). The processor 104 generates the lighting control command based on the detected repositioning. The processor 104 may, for example, be arranged for accessing a memory arranged for storing associations between wireless power transmitter identifiers and light settings, and for comparing an identifier of the identified wireless power transmitter to the stored wireless power transmitter identifiers. The processor 104 may be further arranged for, if a similarity criterion is met between the identified identifier and the stored wireless power transmitter identifier, generating the lighting control command according to a light setting associated with the stored wireless power transmitter identifier. Additionally or alternatively, the processor 104 may, for example, be arranged for accessing a memory arranged for storing associations between gestures and lighting control commands, and for comparing a detected gesture to the stored gestures. A gesture may be defined by a sequence of detections over a period of time of the portable device 120 at a plurality of wireless power transmitters. The processor 104 may be further arranged for, if a similarity criterion is met between the detected gesture and the stored gesture, generating the lighting control command according to a lighting control command associated with the detected gesture. This enables a user to provide a user input to control the light output of the lighting device 110 by moving the portable device 120 across the surface.

Figure 4:
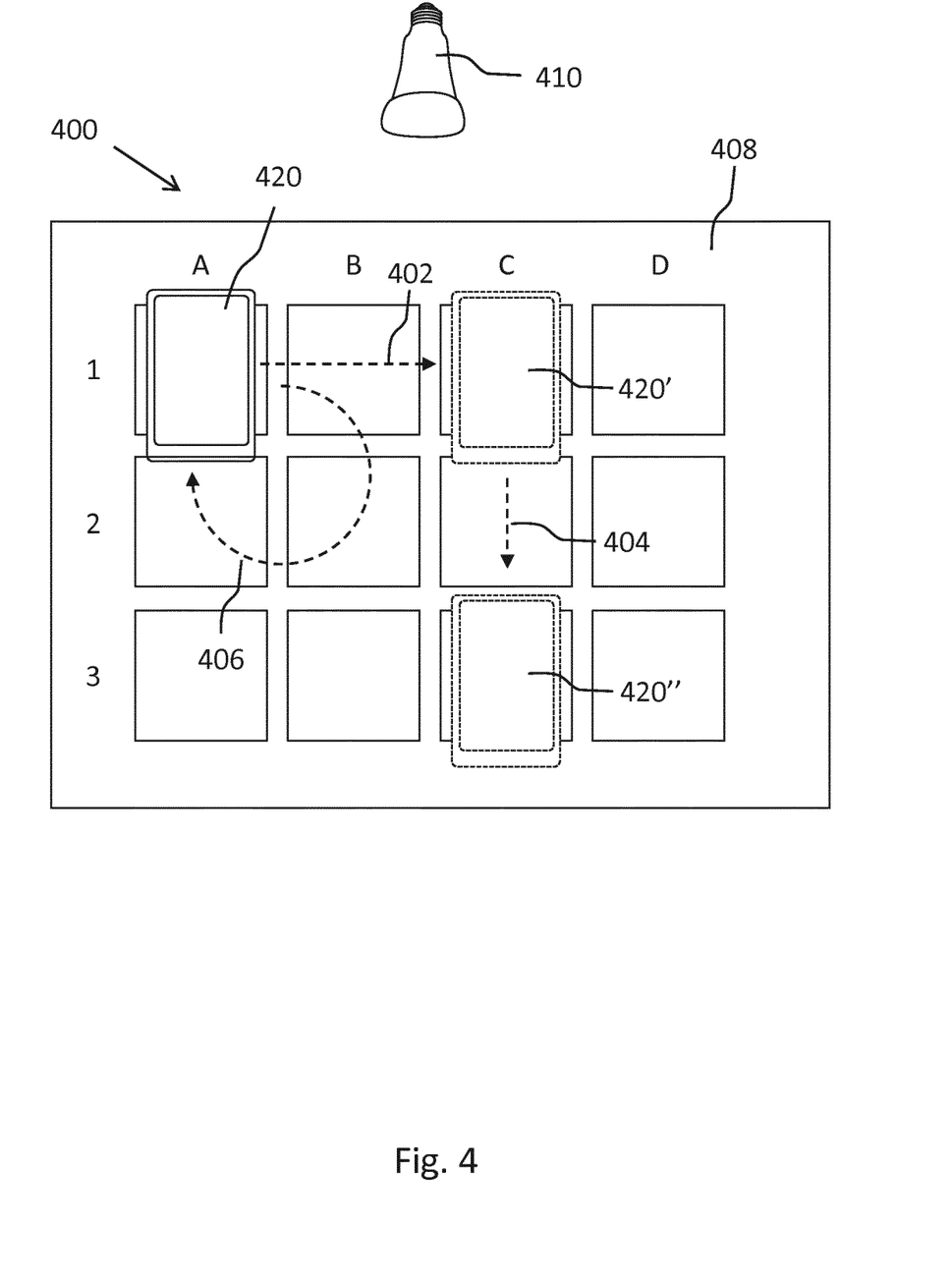
FIG. 4 shows schematically an embodiment of a control system according to the invention for controlling a lighting device, wherein the lighting device is controlled based on a repositioning of a portable device.

FIG. 4 shows schematically an embodiment of a control system 400 according to the invention for controlling a lighting device 410, wherein the lighting device 410 is controlled based on a repositioning 402, 404, 406 of a portable device 420, 420', 420". Surface 408 comprises a matrix of wireless power transmitters (A1-D3). One or more detectors (which may, for example, be comprised in the portable device 420 or in the surface 408) may detect the repositioning of the portable device 420 across a plurality of wireless power transmitters (A1-D3). The processor (which may, for example, be comprised in the portable device 420 or in the surface 408) may identify a first repositioning 402 of the portable device 420 from a first wireless power transmitter A1, via a second wireless power transmitter B1 to a third wireless power transmitter C1. This repositioning 402 may be indicative of a user input related to an adjustment of the light output of the lighting device 410, for example an increase of the brightness of the lighting device 410. The processor may, after the first repositioning 402, detect a second repositioning 404 of the portable device 420' from wireless power transmitter C1 via wireless power transmitter C2 to wireless power transmitter C3. This repositioning 404 may be indicative of a user input related to an adjustment of the color of the light output of the lighting device 410. The processor may, for example, be arranged for generating a first lighting control command comprising instructions for the lighting device 410 to emit a yellow color when the portable device 420' is positioned at wireless power transmitter C1, for generating a first second lighting control command comprising instructions for the lighting device 410 to emit an orange color when the portable device is positioned at wireless power transmitter C2 and for generating a third lighting control command comprising instructions for the lighting device 410 to emit a red color when the portable device 420" is positioned at wireless power transmitter C3. This enables a user to provide a user input to control the intensity of the light emitted by the lighting device 410 by moving the portable device 420 in one direction, and to control the color of the light emitted by the lighting device 410 by moving the portable device in another direction.

In another example the processor may be arranged for interpreting the repositioning as a user gesture indicative of a lighting control command. A user may for example, when referring to the exemplary embodiment of FIG. 4, reposition 406 the portable device 420 from wireless power transmitter A1, to wireless power transmitter B1, to wireless power transmitter B2, to wireless power transmitter A2 and back to wireless power transmitter A1. The one or more detectors (which may, for example, be comprised in the portable device 420 or in the surface 408) may detect the repositioning 406. The processor (which may, for example, be comprised in the portable device 420 or in the surface 408) may identify the repositioning 406, which may be indicative of a user gesture related to an adjustment of the light output of the lighting device 410. The clockwise repositioning 406 may, for example, be indicative of turning the lighting device 110 on (whereas a counterclockwise gesture may be indicative of turning the lighting device 110 off).

It should be noted that the abovementioned examples of providing lighting (gesture) control input by repositioning the portable device are mere examples, and that a person skilled in the art will be able to design many alternatives of providing (gesture) lighting control input by repositioning the portable device without departing from the scope of the appended claims.

In an embodiment, the wireless charging system may comprise a plurality of wireless power transmitters. The detector 102 of the control system 100 may be further arranged for detecting a presence of a first portable device at a first wireless power transmitter and a second portable device at a second wireless power transmitter. The processor 104 may be further arranged for identifying a first property of the first portable device, and for identifying a second property of the second portable device and for generating the lighting control command based on the first property and the second property. The processor 104 may, for example, be arranged for accessing a memory arranged for storing associations between properties (such as types of devices, modes of operation, etc.) and light settings. The processor 104 may further compare the identified properties to the stored properties, and, if a similarity criterion is met between the identified properties and the stored properties, generate the lighting control command according to a light setting associated with the stored properties.

Figure 5:
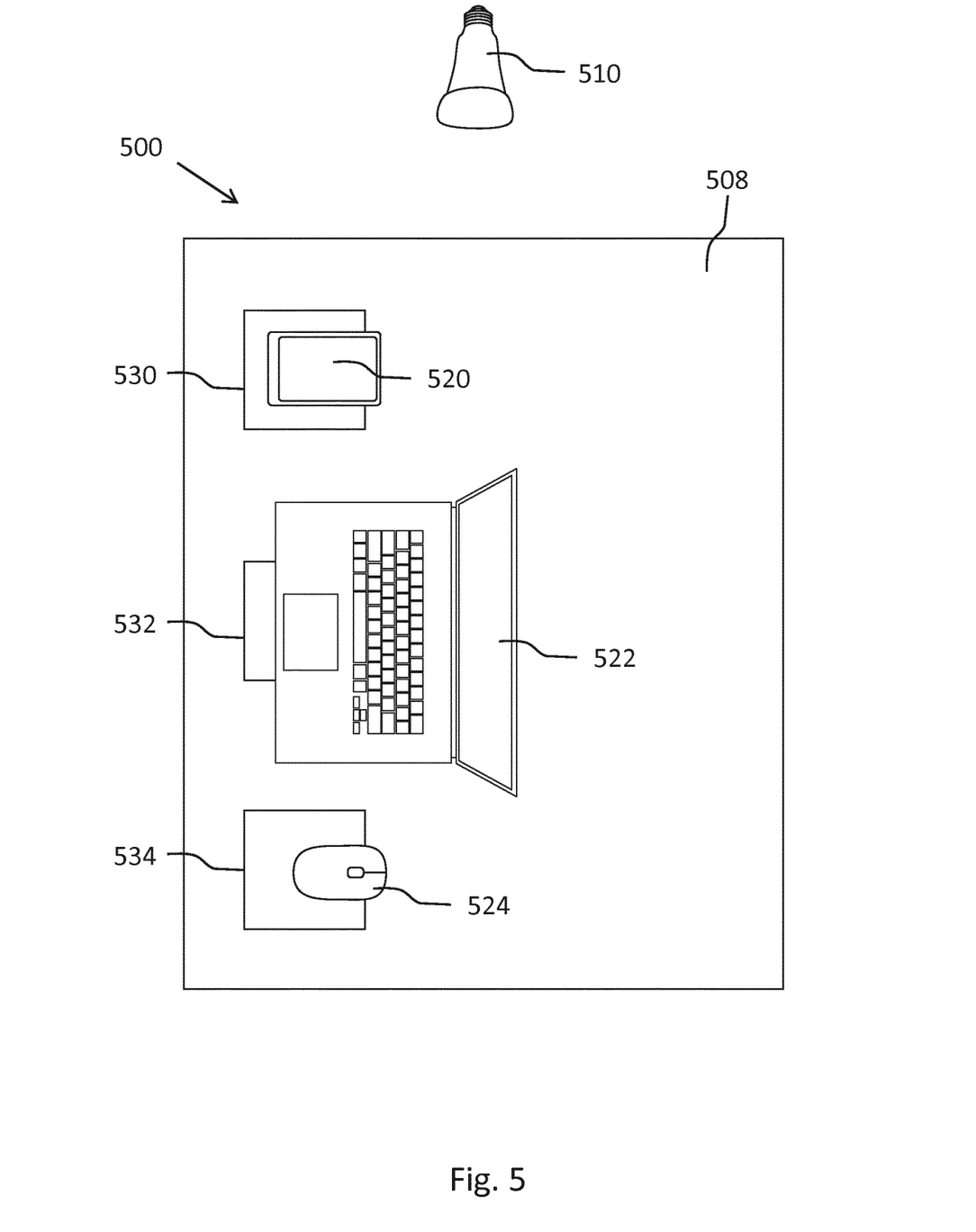
FIG. 5 shows schematically an embodiment of a control system according to the invention for controlling a lighting device, wherein the control system comprises a plurality of wireless power transmitters, and wherein the lighting device is controlled based on properties of portable devices located at the wireless power transmitters.

FIG. 5 illustrates an example of such a wireless charging system 500, comprising a surface 508 which comprises a plurality of wireless power transmitters 530, 532 and 534. Each of the wireless power transmitters 530, 532, 534 may comprise a detector (not shown) for detecting the presence of portable devices 520, 522 and 524. The processor (not shown) may identify the portable devices 520, 522 and 524 based on signals received from the portable devices 520, 522, 524. The processor may determine that a first portable device 520 is a smartphone, a second portable device 522 is a laptop pc, and a third portable device 524 is a wireless computer mouse. The processor may infer contextual information from the types of devices and generate the lighting control command for the lighting device 510 accordingly (e.g. by accessing a memory that stores associations between types of devices and lighting control commands). The presence of a laptop, a wireless computer mouse and a smartphone may be indicative that a user is working, while the presence of a plurality of smart phones may be indicative of a social setting. Additionally, the processor may further determine that the devices are turned on based on signals received from the portable devices 520, 522, 524 and/or receive information regarding their current mode of operation. If, for example, the laptop is running a text editing program the processor may generate the lighting control command to control the lighting device 510 accordingly (e.g. to set the lighting device 510 to functional white lighting), while if the laptop is running a game, the processor may generate a different lighting control command (e.g. to set the lighting device 510 to ambient lighting).

The processor 104 may be further arranged for controlling the lighting device 110 after the portable device 120 has been removed from the wireless power transmitter 130. This may be further based on a property (e.g. type of device, mode of operation, user profile, etc.) of the portable device 120. The processor 104 may, for example, be arranged for controlling the lighting device 110 such that the light output of the lighting device 110 stays the same after the portable device 120 has been removed from the wireless power transmitter 130, or such that the lighting device 110 is turned off (e.g. immediately or by dimming the light down over a period of time). Additionally or alternatively, the processor 104 may be arranged for controlling the lighting device 110 such that the light output of the lighting device 110 stays the same for a predefined period of time after the portable device 120 has been removed from the wireless power transmitter 130. Additionally or alternatively, the processor 104 may be arranged for turning the lighting device 110 off after the portable device 120 has been removed from the wireless power transmitter 130 and the presence of the portable device 120 has been detected at another wireless power transmitter. Additionally or alternatively, the processor 104 may be arranged for generating a lighting control command and communicate the lighting control command to another lighting device after the portable device 120 has been removed from the wireless power transmitter 130. The portable device may, for example, be a car key, and, upon removal of the set of car keys, the processor 104 may generate a lighting control command for controlling the interior of a car, and communicate this lighting control command to the car.

Figure 6:
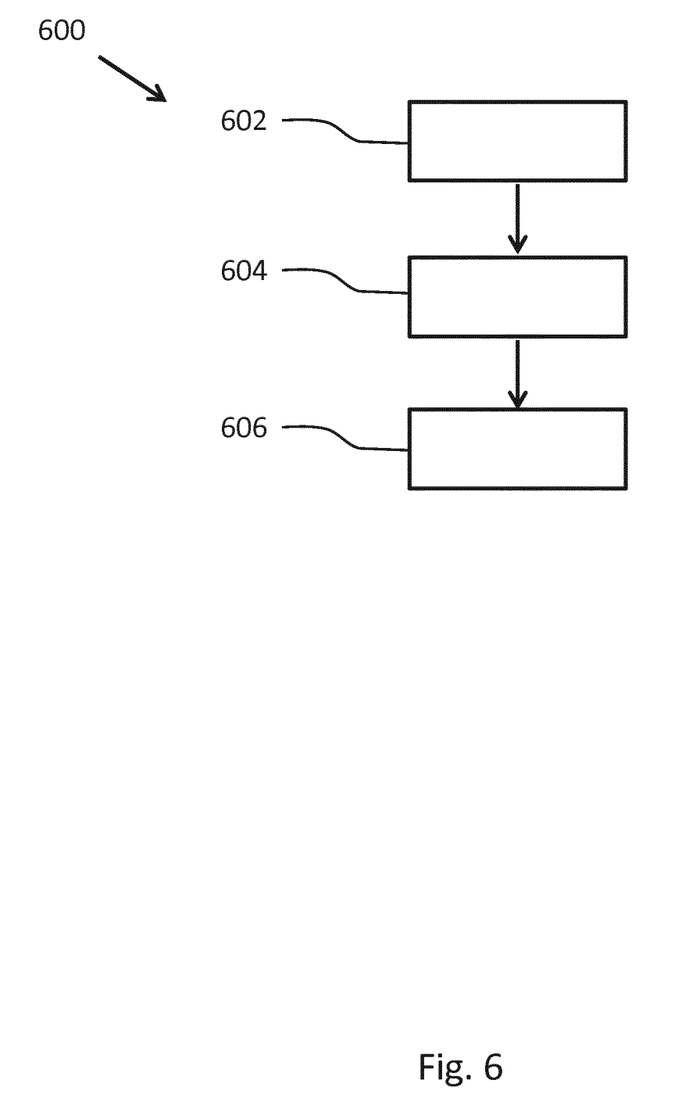
FIG. 6 shows schematically steps of a method of controlling a lighting device arranged for providing functional and/or atmosphere lighting.

FIG. 6 shows schematically steps of a method 600 of controlling a lighting device arranged for providing functional and/or atmosphere lighting. The method comprises the steps of:
  detecting 602 a presence of a portable device at a wireless power transmitter arranged for charging the portable device,
  generating 604 a lighting control command when the presence of the portable device has been detected, and
  communicating 606 the lighting control command to the lighting device.

The steps of the method 600 may be executed by a computer program running on the processor 104 of the control system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A control system, for controlling a lighting device arranged for providing functional and/or atmosphere lighting, the control system comprising:
  a detector for detecting a presence of a portable device at a wireless power transmitter arranged for charging the portable device,
  a processor for generating a lighting control command when the presence of the portable device has been detected, and
  a communication unit for communicating the lighting control command to the lighting device, wherein the processor is arranged for identifying at which wireless power transmitter of a plurality of wireless power transmitters the portable device is present, and for generating the lighting control command based thereon.

2. The control system of claim 1, wherein the processor is further arranged for identifying a property of the portable device, and for generating the lighting control command based on the identified property.

3. The control system of claim 2, wherein the property is related to a current mode of operation of the portable device, and wherein the processor is further arranged for generating the lighting control command based on the current mode of operation.

4. The control system of claim 1, wherein the processor is further arranged for receiving a light setting signal indicative of a light setting from the portable device, and for generating the lighting control command further based on the light setting signal.

5. The control system of claim 1, wherein the processor is further arranged for identifying a repositioning of the portable device from a first wireless power transmitter to a second wireless power transmitter, and wherein the processor is further arranged for generating the lighting control command based on the repositioning.

6. A portable device for controlling a lighting device arranged for providing functional and/or atmosphere lighting, the portable device comprising the control system of claim 1, wherein the detector is arranged for detecting the presence of the portable device at the wireless power transmitter based on a signal received from the wireless power transmitter.

7. A wireless charging system for controlling a lighting device arranged for providing functional and/or atmosphere lighting, the wireless charging system comprising:
   a wireless power transmitter for charging a portable device, and
   a control system according to the control system of claim 1.

8. The wireless charging system of claim 7, wherein the processor of the control system is further arranged for identifying a type of the portable device, and for generating the lighting control command based on the type of the portable device.

9. The wireless charging system of claim 7, wherein the wireless charging system comprises a plurality of wireless power transmitters, and wherein the detector is arranged for detecting a presence of a first portable device at a first wireless power transmitter, and for detecting a presence of a second portable device at a second wireless power transmitter, and wherein the processor is further arranged for identifying a first property of the first portable device, and for identifying a second property of the second portable device, and for generating the lighting control command based on the first property and the second property.

10. A method of controlling a lighting device arranged for providing functional and/or atmosphere lighting, the method comprising:
   detecting a presence of a portable device at a wireless power transmitter arranged for charging the portable device,
   identifying at which wireless power transmitter of a plurality of wireless power transmitters the portable device is present,
   generating a lighting control command based on at which at which wireless power transmitter of the plurality of wireless power transmitters the portable device is present, and
   communicating the lighting control command to the lighting device.

11. The method of claim 10, further comprising:
   accessing a memory storing associations between wireless power transmitter identifiers and light settings,
   comparing an identifier of the identified wireless power transmitter to the stored wireless power transmitter identifiers, and, if a similarity criterion is met between the identified identifier and the stored wireless power transmitter identifier,
   generating the lighting control command according to a light setting associated with the stored wireless power transmitter identifier.

12. The method of claim 10, further comprising:
   identifying a property of the portable device, and
   generating the lighting control command based on the property of the portable device.

13. A computer program product for a computing device, the computer program product comprising computer program code to perform the method of claim 10 when the computer program product is run on a processing unit of the computing device.

* * * * *